(12) United States Patent
Wolpert et al.

(10) Patent No.: US 11,055,465 B2
(45) Date of Patent: Jul. 6, 2021

(54) FILL TECHNIQUES FOR AVOIDING BOOLEAN DRC FAILURES DURING CELL PLACEMENT

(71) Applicant: INTERNATIONAL BUSINESS MACHINES CORPORATION, Armonk, NY (US)

(72) Inventors: David Wolpert, Poughkeepsie, NY (US); Timothy A. Schell, Cary, NC (US); Michael Gray, Fairfax, VT (US); Erwin Behnen, Austin, TX (US); Robert Mahlon Averill, III, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 8 days.

(21) Appl. No.: 16/559,967

(22) Filed: Sep. 4, 2019

(65) Prior Publication Data

US 2021/0064719 A1    Mar. 4, 2021

(51) Int. Cl.
*G06F 30/30* (2020.01)
*G06F 30/392* (2020.01)
(Continued)

(52) U.S. Cl.
CPC .......... *G06F 30/392* (2020.01); *G06F 30/398* (2020.01); *G06F 30/30* (2020.01); *G06F 30/39* (2020.01); *G06F 2111/20* (2020.01); *G06F 2115/08* (2020.01); *G06F 2117/12* (2020.01); *G06F 2119/02* (2020.01); *G06F 2119/18* (2020.01); *G06F 2119/22* (2020.01)

(58) Field of Classification Search
None
See application file for complete search history.

(56) References Cited

U.S. PATENT DOCUMENTS 5,671,152 A * 9/1997 Lavin ...................... G06F 30/39
716/119
7,470,489 B2 * 12/2008 Liebmann ................ G03F 1/30
430/5

(Continued)

OTHER PUBLICATIONS

J. Cong et al., "Robust Mixed Size Placement Under Tight White Space Constraints," 2005 IEEE, pp. 165-172. (Year: 2005).*

(Continued)

*Primary Examiner* — Leigh M Garbowski
(74) *Attorney, Agent, or Firm* — Cantor Colburn LLP; William Kinnaman

(57) ABSTRACT

Methods, systems and computer program products for avoiding Boolean DRC failures during cell placement are provided. Aspects include generating a semiconductor layout by filling a plurality of rows within a macro block with cells including functional cells and fill cells. Aspects also include modifying the semiconductor layout by removing one or more fill cells from the macro block to create a gap. Aspects also include examining a set of cells that border edges of the gap to identify one or more predicted rule violations. Based on the identified one or more predicted rule violations, aspects also include modifying the semiconductor layout to change a shape of the gap to avoid the one or more predicted rule violations.

20 Claims, 9 Drawing Sheets

(51) Int. Cl.
*G06F 30/398* (2020.01)
*G06F 30/39* (2020.01)
*G06F 111/20* (2020.01)
*G06F 115/08* (2020.01)
*G06F 119/22* (2020.01)
*G06F 119/02* (2020.01)
*G06F 119/18* (2020.01)
*G06F 117/12* (2020.01)

(56) References Cited

U.S. PATENT DOCUMENTS

| | | | | |
|---|---|---|---|---|
| 7,709,301 | B2* | 5/2010 | Bosshart | H01L 27/0207 |
| | | | | 438/129 |
| 8,490,038 | B1* | 7/2013 | Arora | G06F 30/392 |
| | | | | 716/110 |
| 9,652,579 | B1* | 5/2017 | Arkhipov | G06F 30/398 |
| 10,254,642 | B2* | 4/2019 | Deshpande | G03F 7/70441 |
| 10,276,554 | B1 | 4/2019 | Chen et al. | |
| 10,678,988 | B2* | 6/2020 | Correale, Jr. | G06F 30/3312 |
| 10,699,050 | B2* | 6/2020 | Wolpert | G06F 30/398 |
| 2005/0044522 | A1 | 2/2005 | Maeda | |
| 2010/0205573 | A1* | 8/2010 | Busa | G06F 30/398 |
| | | | | 716/52 |
| 2011/0258588 | A1 | 10/2011 | Sharma et al. | |
| 2018/0006010 | A1 | 1/2018 | Lo et al. | |
| 2019/0188353 | A1* | 6/2019 | Correale, Jr. | G06F 30/3312 |

OTHER PUBLICATIONS

H. Zhang et al., "On Process-Aware 1-D Standard Cell Design," 2010 IEEE, pp. 838-842. (Year: 2010).*

K. Han et al., "Scalable Detailed Placement Legalization for Complex Sub-14nm Constraints," 2015 IEEE, pp. 867-873. (Year: 2015).*

Transmittal Form PTO/SB/21 signed Mar. 17, 2020.

Gazor, "Design for Manufacturability with Regular Fabrics in Digital Integrated Circuits," Massachusetts Institute of Technology, Department of Electrical Engineering and Computer Science, May 11, 2005, 115 pgs.

* cited by examiner

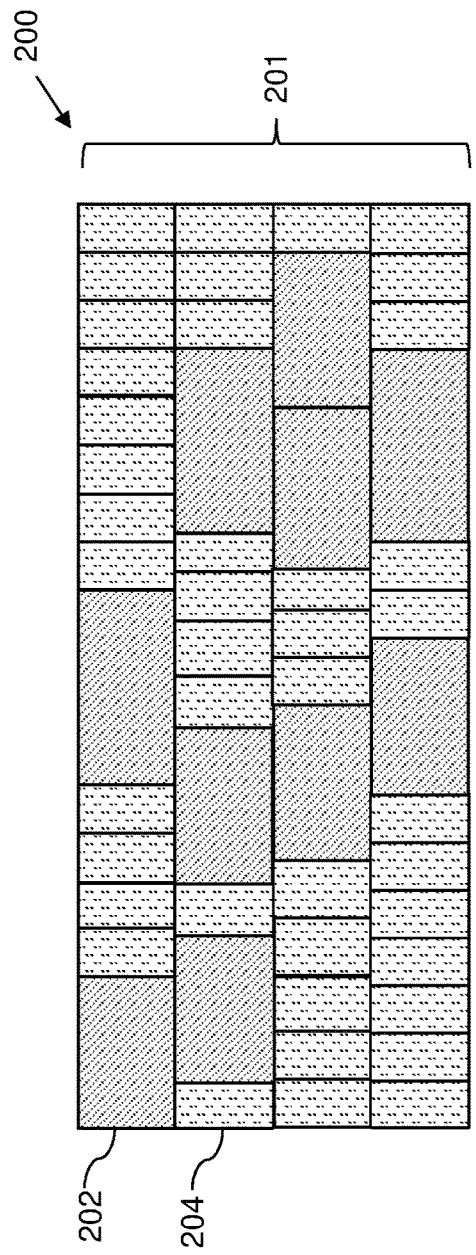
FIG. 2A
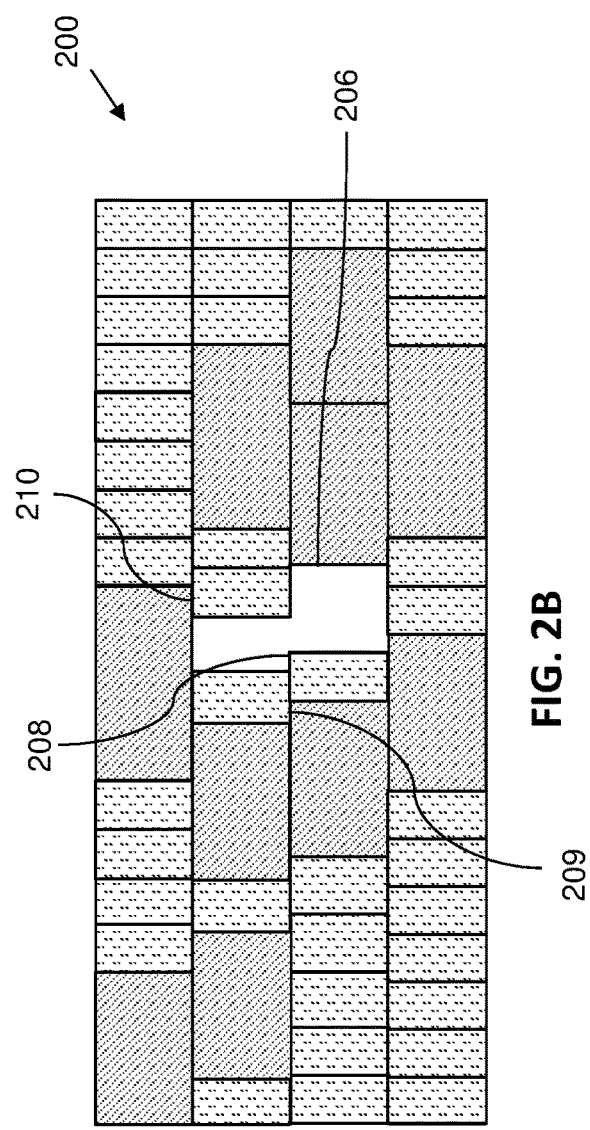
FIG. 2B
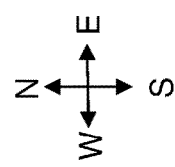
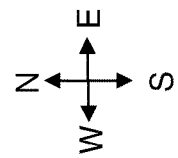

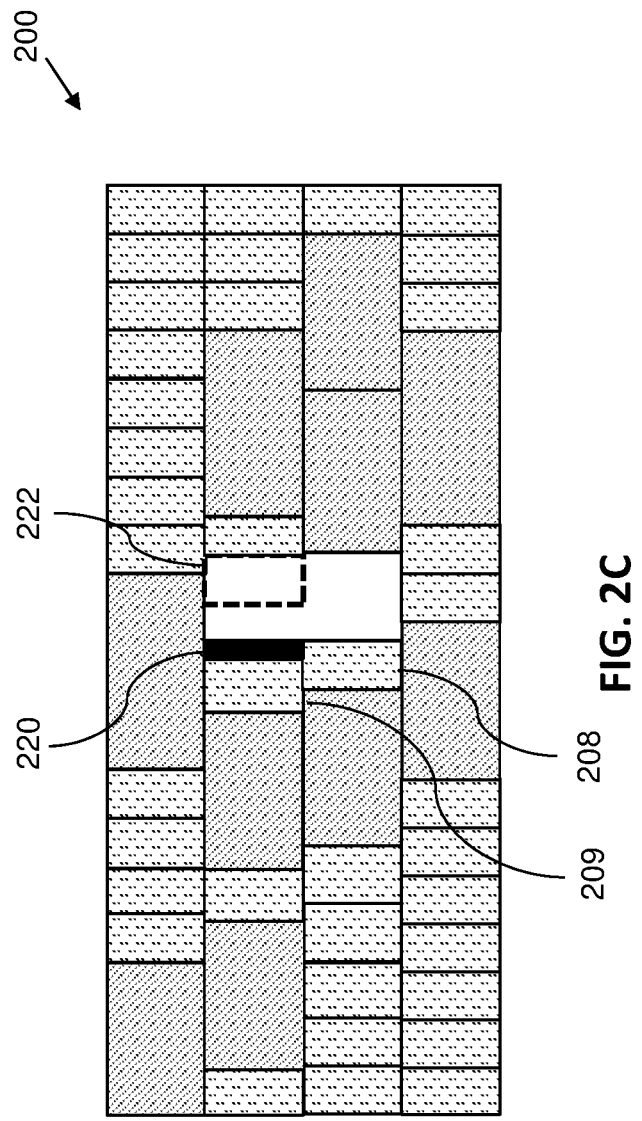
FIG. 2C
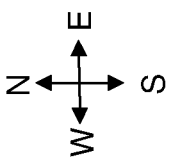

FILL TECHNIQUES FOR AVOIDING BOOLEAN DRC FAILURES DURING CELL PLACEMENT

BACKGROUND

The present invention generally relates to methods and resulting structures for semiconductor devices, and more specifically, to fill techniques for avoiding Boolean design rule check (DRC) failures during cell placement.

The individual components of an integrated circuit (IC) are extremely small and its production demands precision at an atomic level. IC fabrication is a complex process during which electronic circuits are created in and on a wafer made out of very pure semiconducting material, typically silicon. The manufacturing is a multiple-step sequence which can be divided into two major processing stages, namely front-end-of-line (FEOL) processing and back-end-of-line (BEOL) processing. FEOL refers to the construction of the components of the IC directly inside the wafer. FEOL is the first portion of IC fabrication where the individual devices (such as transistors, capacitors, resistors, etc.) are patterned in the semiconductor. FEOL generally covers all steps up to the deposition of metal interconnect layers. FEOL contains all steps of CMOS fabrication needed to form fully isolated CMOS elements. The processes can include, but are not limited to, selecting the type of wafer to be used, chemical-mechanical planarization and cleaning of the wafer, shallow trench isolation (STI), transistor channel formation, gate module formation, and source and drain module formation. Design rules are geometric constraints that are imposed on IC design to ensure that designs function properly, reliably, and can be produced with acceptable yield.

SUMMARY

Embodiments of the present invention are directed to fill techniques for avoiding Boolean DRC failures during cell placement. A non-limiting example computer-implemented method includes generating a semiconductor layout by filling a plurality of rows within a macro block with cells including functional cells and fill cells. The method also includes modifying the semiconductor layout by removing one or more fill cells from the macro block to create a gap. The method also includes examining a set of cells that border edges of the gap to identify one or more predicted rule violations. Based on the identified one or more predicted rule violations, the method also includes modifying the semiconductor layout to change a shape of the gap to avoid the one or more predicted rule violations.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 2A depicts a fully filled-in semiconductor layout for building a semiconductor device according to embodiments of the invention;

FIG. 2B depicts the semiconductor layout for building a semiconductor device modified to remove cells according to embodiments of the invention;

FIG. 2C depicts the semiconductor layout for building a semiconductor device modified to avoid one or more predicted rule violations according to embodiments of the invention;

Figure 1:
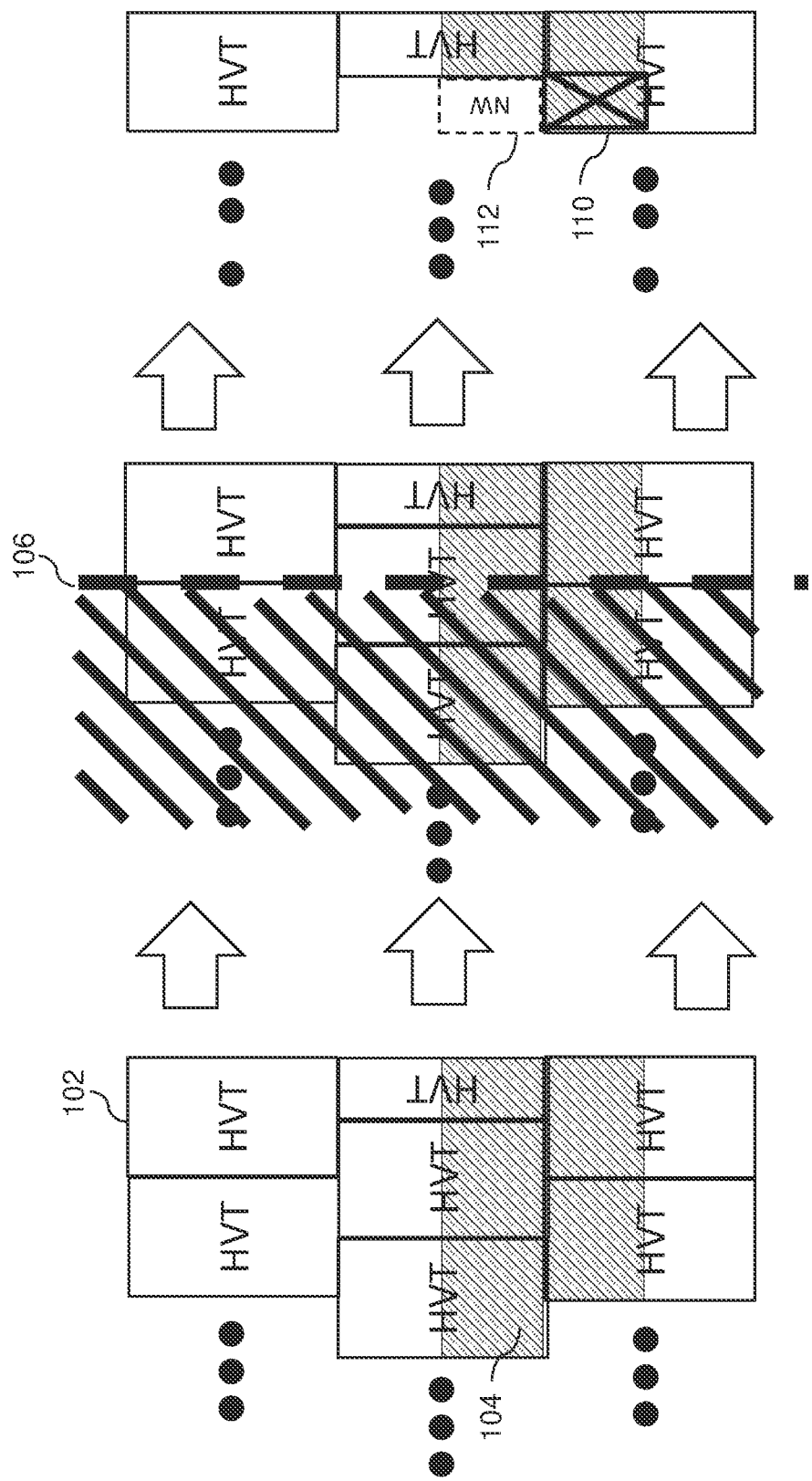
FIG. 1 illustrates a cell removal procedure resulting in a design rule check violation for cells of a semiconductor layout for a semiconductor device in accordance with one or more embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Very-large-scale integration (VLSI) is the process of creating an integrated circuit (IC) by combining billions of transistors into a single chip. Integrated circuit layout, also known as IC layout, IC mask layout, or mask design, is the representation of an integrated circuit in terms of planar geometric shapes which correspond to the patterns of metal, oxide, or semiconductor layers that make up the components of the integrated circuit. When using a standard process, where the interaction of the many chemical, thermal, and photographic variables is known and carefully controlled, the behavior of the final integrated circuit depends largely on the positions and interconnections of the geometric shapes. Using a computer-aided layout tool, the layout engineer or layout technician places and connects all of the components that make up the chip such that they meet certain criteria, typically performance, size, density, and manufacturability.

Design rule checking or check(s) (DRC) is the area of electronic design automation that determines whether the physical layout of a particular chip layout satisfies a series of recommended parameters called design rules. Design rule checking is a major step during physical verification signoff on the design. Design rules are a series of parameters provided by semiconductor manufacturers that enable the designer to verify the correctness of a mask set. Design rules are specific to a particular semiconductor manufacturing process. A design rule set specifies certain geometric and connectivity restrictions to ensure sufficient margins to account for variability in semiconductor manufacturing processes, so as to ensure that the parts work correctly. Two of the most basic design rules are a width rule that specifies the minimum width of any shape (e.g., the minimum width of a threshold voltage (VT) shape used to define device performance) in the design and a spacing rule that specifies the minimum distance between two adjacent shapes. These rules will exist for each layer of a semiconductor manufacturing process. Boolean DRC failures can refer to DRC failures (e.g., unacceptable widths/gaps/spaces/etc.) on or between shapes from a mask layer that has been derived as a Boolean combination of design layers or other derived layers.

The main objective of design rule checking is to achieve a high overall yield and reliability for the design. If design rules are violated, the design may not be functional. To meet this goal of improving die yields, DRC has evolved from simple measurement and Boolean checks, to more involved rules that modify existing features, insert new features, and check the entire design for process limitations such as layer density. A completed layout consists not only of the geometric representation (shape requirements) of the design, but also data that provides support for the manufacture of the design. While design rule checks do not validate that the design will operate correctly, they are constructed to verify that the structure meets the process constraints for a given design type and process technology (for fabrication).

DRC software can take as input a layout in the OASIS format (or the older GDSII standard format) and a list of rules specific to the semiconductor process chosen for fabrication. From these, DRC software produces a report of design rule violations that the designer may or may not choose to correct. Carefully "stretching" or waiving certain design rules is often used to increase performance and component density at the expense of yield. Some examples of DRCs in IC design include: active to active spacing, well to well spacing, the minimum channel length of the transistor, minimum metal width, metal to metal spacing, metal fill density (for processes using CMP), poly density, ESD and I/O rules, antenna effect, etc.

Turning now to an overview of technologies that are more specifically relevant to aspects of the invention, an algorithm for automated front-end-of-line shape merging cell placement and optimization for very-large-scale integration (VLSI) can be used to freely place standard cells with varying alignment periodicities, routing needs, and critical path locations in integrated circuits. Randomly placed shapes can be merged to ensure DRC compliance while maintaining performance integrity regardless of cell placement solution, neighboring cell timing sensitivities, and concurrent hierarchical design boundaries. Use of such an algorithm can result in the creation of a DRC compliant "brick wall" of cells that ensure there are no 1 or 2 pitch gaps between threshold voltage (VT) shapes by filling gaps between active cells with fill cells such that all circuit rows are completely filled with cells. However, in some cases, such as when separately designed blocks interrupt circuit rows, one circuit row may have a cell and the row below it may not (e.g., due to the creation of a gap in the "brick wall" designed to accommodate the insertion of the separately designed block), and the algorithm may leave dangling cells in the active rows with shapes (e.g. such as VT shapes or n-well (NW) shapes) that cause a Boolean DRC fail. Traditionally, this is an especially difficult problem to rectify because Boolean DRC failures do not provide easily understandable information that indicates the cause of the failure (e.g., often having dozens of Boolean manipulations needed to understand what specific shapes are responsible for the violations). Prior solutions have involved a post-process that looks for dangling fills and either removes them or pads the dangling shapes with sufficient dummy shapes to satisfy the Boolean violations after the initial semiconductor layout has been completed, however this requires a large amount of additional manual effort to debug the situation and determine an acceptable solution. Thus, there is a need for a mechanism that can determine where one row has a cell and an adjacent row does not such that the configuration may give rise to a Boolean failure due to, for example, the fact that an appropriate NW/VT/etc. area is missing. By providing such a mechanism at the time of cell placement, locations that would otherwise result in Boolean fails can be addressed without needing the additional time and effort associated with running DRC checking and fixing identified fails manually.

Turning now to an overview of the aspects of the invention, one or more embodiments of the invention address one or more of the above-described shortcomings of the prior art by providing techniques for avoiding the problem of Boolean failures caused by dangling cells by utilizing a "look-around method" at the time of cell construction. The "look-around method" provides a region-aware fill method that includes, for each hole/gap in the "brick wall" of cells, examining the cells that surround the hole (i.e., cells disposed on the north, south, east and west (N/S/E/W) boundaries of the hole) to predict any rule violations caused by the existence of the hole in conjunction with one or more surrounding cells, and proactively fixing the rule violation during this cell placement phase (as opposed to complex debugging performed in response to detecting failures during DRC). In some embodiments, a similar "look-around method" can be executed for each cell that is inserted into the design, looking at the surrounding cells (i.e., cells disposed to the N/S/E/W of the inserted cell) to ensure that the inserted cell is not causing a dangling fill. Thus, the method involves looking for areas where a Boolean violation could exist upon creation of a gap or upon insertion of a cell because of, for example, a bad combination of cell placements or missing cells. The method involves looking at interactions and relationships between adjacent cells (i.e., adjacent to a gap or adjacent to a newly placed cell) and adjusts the semiconductor layout to add or remove cells/stitches to the gap. An algorithm can fill the gaps based on the nature of the surrounding N/S/E/W cells in a manner that avoids dangling fills/Boolean fails. Discovery of Boolean violations by manual inspection is very difficult due to complex relationships between cells, but the correct-byconstruction design tool described herein can avoid and/or eliminate such Boolean failure issues without the need to perform DRC checks.

Turning now to a more detailed description of aspects of the present invention, FIG. 1 depicts a design rule check for cells of a semiconductor layout for a semiconductor device. The design rule check of the cells can be performed by a computer system (such as computer 300 described below). In FIG. 1, the cells represent transistor regions in which the transistor regions have a high threshold voltage (HVT). As shown on the left portion of FIG. 1, when initially placed, the HVT cells 102 may be "brickwalled" (i.e., placed in a brickwall configuration where there are no gaps in between placed cells) adjacently with other cells (HVT or otherwise, although only HVT is shown in FIG. 1 for simplicity). As shown on the left portion of FIG. 1, the HVT cells may be arranged in an arbitrary brickwall pattern resulting from a place and route optimization algorithm. The example shaded shapes 104 may refer to an NW shape or VT shape for a given device (e.g. PMOS HVT or NMOS HVT). As shown on the left portion of FIG. 1, the NW or VT shapes exist in a brickwall pattern, ensuring a given NW shape has a total width corresponding to some fraction of two separate circuit rows. When a separate layout block needs to be placed into a section of fill cells, represented in FIG. 1 by the dashed region 106, any cell overlapping that dashed region will be removed. As shown on the right of FIG. 1, this configuration can lead to a Boolean DRC failure 110 because the section of NW that previously existed from a neighboring circuit row 112 no longer exists, and the resultant NW shape is insufficiently wide to satisfy the patterning requirements of the technology.

Turning now to FIGS. 2A, 2B and 2C, which represent various stages of a semiconductor layout 200 that display an example of the disclosed techniques for avoiding Boolean DRC failures during cell placement in accordance with one or more embodiments of the present invention. FIG. 2A shows an example semiconductor layout 200 that has undergone a process to completely fill the rows of the semiconductor layout 200 with standard cells to create a DRC compliant "brick wall". According to some embodiments, the semiconductor layout 200 can include a number of freely placed functional cells (which may also be referred to as "logic cells") with varying alignment periodicities, routing needs, and critical path locations and the remainder of the semiconductor layout 200 can be filled in with a plurality of fill cells 204. The functional cells are the cells (having many devices) that perform operations in the semiconductor device. The design shape is the type of functional cell, and functional cells can include for example, HVT regions, regular threshold voltage (RVT) regions, and low threshold voltage (LVT) regions. Each cell can be considered a collection of design shapes as understood by one skilled in the art. The functional cells 202 include and/or operate as various logic blocks such as inverters, NAND gates, NOR gates, etc. and each of the functional cells 202 perform operations in an integrated circuit as understood by one skilled in the art. Fill cells 204 can be non-functional cells that have characteristics that are designed to ensure that the semiconductor layout 200 is DRC compliant. For example, a fill cell 204 can be designated to have a threshold voltage (e.g., an LVT region, RVT region, or HVT region) that are selected to provide DRC compliance based on the characteristics of the adjacent cells (e.g., the spacing between the adjacent cells threshold voltages of the adjacent cells). For example, the transistors in the non-functional fill cells 204 can have their threshold voltage determined by the type of dopants in their source/drain, the work function metal in their gate stack, and/or the thickness of their gate dielectric. Therefore, the threshold voltage is structured to be high, regular, and low according to the HVT region, RVT region, and LVT region, even though there might be no power provided to the transistors in the fill cells 204. According to some embodiments, following the execution of a cell placement and fill algorithm, an initial semiconductor layout 200 such as the example shown in FIG. 2A can be generated that has no gaps between cells. In other words, the edges of each adjacent cell in the semiconductor layout 200 may touch or overlap such that there is no empty space between them.

Figure 3:
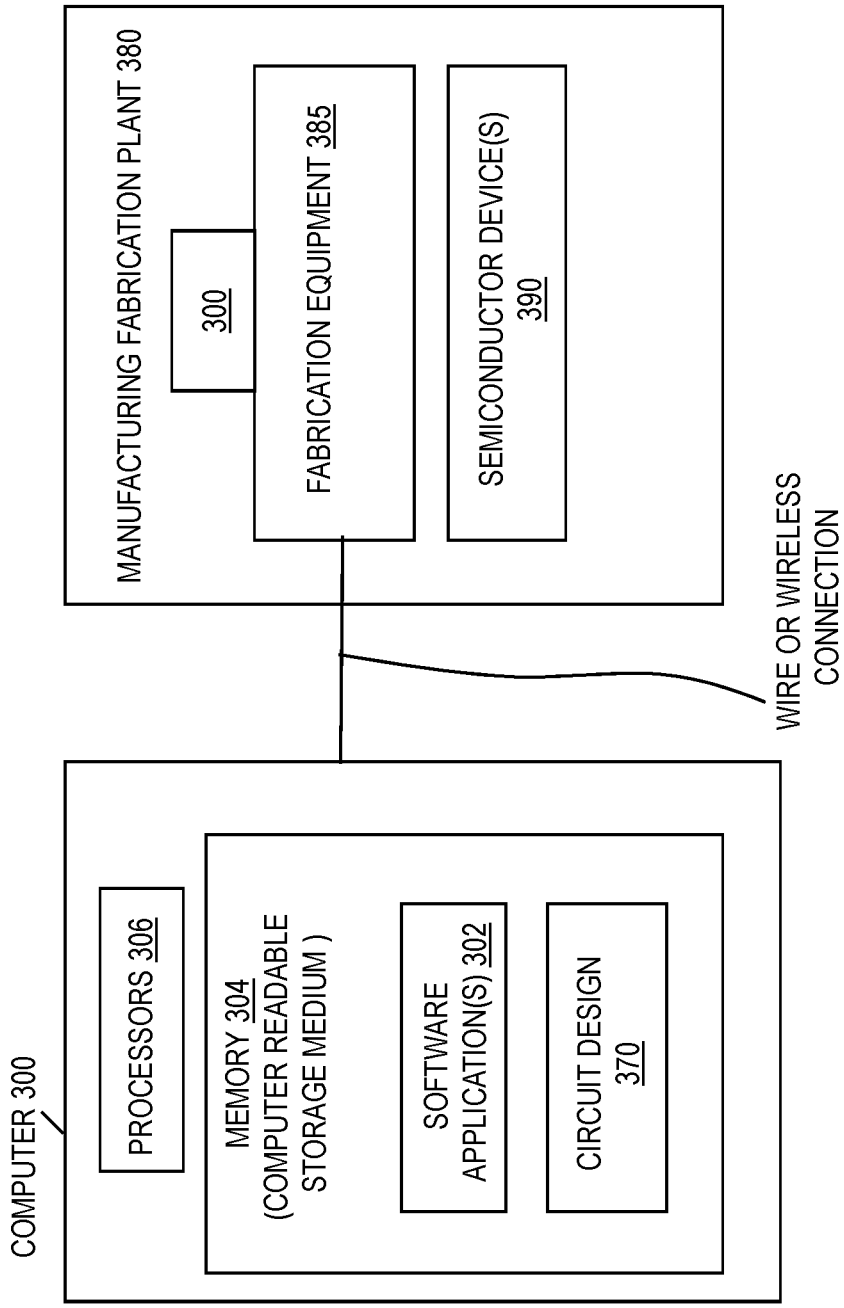
FIG. 3 depicts a system of a computer system integrated with a manufacturing fabrication plant according to embodiments of the invention.

In some embodiments, the semiconductor layout 200 can be generated using the computer system 300 shown in FIG. 3. The computer system 300 has one or more software applications 302 configured to function and implement operations as discussed herein. For example, software applications 302 may include one or more place and fill routines for placing functional cells 202 and fill cells 204 in a manner resulting in a semiconductor layout 200 having no empty spaces or gaps between cells. The software applications 302 can provide a mechanism for ensuring DRC compliance of an initially generated "brick wall" of cells, and also in cases where some cells have been intentionally removed from the "brick wall" to, for example, provide a space for the placement of separately designed layout blocks. These blocks may be placed into the brickwall seamlessly or may have separate boundary conditions requiring a break in the brick wall, and for the associated fill cells in those locations to be removed to make room for the separately designed layout block. Additionally, any functional cells in the vicinity of that block may have to be moved to locations occupied by other fill cells that are not in the region where the separately designed layout block would be placed (with those fill cells subsequently removed to make space for the functional cells). A semiconductor layout 200 can be constructed by the software application 302 of the computer 300 to build the semiconductor device (e.g., an integrated circuit). The computer 300 is configured to configured to guarantee design rule cleanliness (i.e., pass) for the semiconductor device before and/or without requiring a design rule check. The software applications 302 include, integrate, are coupled to, and/or function as electronic design automation (EDA), also referred to as electronic computer-aided design (ECAD). Electronic design automation is a category of software tools for designing electronic systems such as integrated circuits and printed circuit boards. The tools work together in a design flow that chip designers use to design and analyze entire semiconductor chips. In some implementations, the computer 300 is coupled to, integrated with, and/or part of the fabrication equipment 385 at the manufacturing fabrication plant 380 (so as to communicate with and/or control operations of the fabrication equipment 385) to thereby fabricate semiconductor device(s) 390 as depicted in FIG. 3, as understood by one skilled in the art. The computer 300 includes one or processors 306 configured to execute one or more software applications 302 in memory 304. The computer 300 receives input of a design 370 for the semiconductor device 390, and the computer 300 is configured to develop/form the semiconductor layout 200 for the semiconductor device in order to build the semiconductor device. The semiconductor layout 200 is a physical design released to the manufacturing fabrication (Fab) plant 380 and physically fabricated by the fabrication equipment 385 to produce the semiconductor device 390. The manufacturing fabrication plant 380 builds the photo mask from the semiconductor layout 200 as a physical design, and then builds the actual product using the photo mask. The product is an integrated circuit (i.e., semiconductor device 390) on a wafer according to the semiconductor layout 200 (physical design). There may be numerous integrated circuits on a wafer, and each integrated circuit may be diced into an individual chip.

As will be appreciated by those of skill in the art, the computer 300 can be configured to place/insert cells into the semiconductor layout 200 to generate a "brick wall" as shown by the example in FIG. 2A through using one or more known techniques or algorithms. The semiconductor layout 200 shown in FIG. 2A may represent one macro block 201 of many (e.g., hundreds, thousands, etc.) in a larger semiconductor layout, although for ease of understanding only one macro block 201 is illustrated. A macro block is a collection of cells (with each cell containing one or more transistors) that provides a useful layer of hierarchical abstraction for designing an integrated circuit that may contain billions of transistors. Although only one macro block 201 is shown in FIG. 2A and discussed herein, it should be understood that discussions about macro block 201 apply by analogy to other macros blocks in the semiconductor layout 200. For example, the macro block 201 shown in FIG. 2A can be surrounded by other macro blocks and can be hierarchically within an even larger macro block. According to some embodiments, a fill routine can initially fill the semiconductor layout with various logic cells 202, such as HVT cells, RVT cells and LVT cells, and then fill in the gaps between the logic cells 202 with fill cells 204 in a manner that ensures that the initial semiconductor layout 200 is DRC compliant, resulting in a fully filled macro block, such as the macro block 201 shown in FIG. 2A.

In some cases, it can be desirable to "punch a hole" in the "brick wall" to remove various fill cells 204 to create an empty space in which separately designed layout blocks may be placed. FIG. 2B shows an example in which such a gap 206 is intentionally created in the semiconductor layout 200. A gap 206 may also be an empty space that may also be referred to as a "hole". According to some embodiments, the gap 206 may be generated by computer 300 based on user inputs that specify the location and/or cells to be removed. However, as a consequence of creating the gap 206, there can exist cell configurations that can give rise to Boolean DRC failures, such as the failures described above with respect to FIG. 1. As shown in FIG. 2B, adjacent to the edges of the gap 206 there exists a partially exposed fill cell 208. This cell 208 is considered to be "partially exposed" because the north edge of the cell extends beyond the boundary of the south edge of the adjacent cell 209. Similarly, adjacent to the edges of the gap 206 there also exists a dangling fill cell 210. This cell 210 is considered to be "dangling" because the west and south edges are not touching any other cells, but are instead "dangling" into the gap 206. Partially exposed cells and dangling fill cells such as those depicted in FIG. 2B are known to give rise to Boolean DRC failures. Thus, to avoid lengthy and complicated future debugging of Boolean DRC failures caused by this type of configuration, it is desirable to fix these issues at the time of cell construction in accordance with the techniques disclosed herein.

FIG. 2C shows an example of a semiconductor layout 200 that has been modified to fix the Boolean DRC failure issues posed by the configuration shown in FIG. 2B. In particular, the software applications 302 of computer 300 can be configured to first detect the existence of one or more problematic cells (i.e., cell configurations that will give rise to Boolean DRC failures) by performing a "look-around" method and can then modify the semiconductor layout 200 to fix the issues giving rise to the Boolean DRC failures by the one or more problematic cells. The "look-around" method can include examining all of the cells on the N/S/E/W boundaries of the gap 206 to determine if there are any partially exposed cells, dangling cells, or other problematic cells. For instance, computer 300 can examine each cell that has at least one edge that borders the edge of the gap 206 and look at what other cells are interacting with those cells (or the absence of cells interacting with those cells) to determine if the configuration is problematic. These interactions may include widths, spaces, notches, spans, or other types of DRC criteria. According to some embodiments, problematic cells may be cells that do not meet for example, one or more requirements of a minimum width for a run length (i.e. the length of overlap between the x coordinates or y coordinates of two shapes), a minimum space (i.e. the distance between two shapes), notch/bump (i.e. the distance between vertices for a given shape), a minimum area or a minimum enclosed area, or any other such parameters as may be required by a set of DRC rules. According to some embodiments, a routine executed by computer 300 may begin for example, by examining the cell that is on the north-most edge of the gap and that is positioned furthest to the west to determine whether it and/or the cells adjacent to it satisfy DRC rules or present a violation of DRC rules. In some embodiments, the routine may next examine an adjacent cell to the east (or south if there is no next eastern cell that borders the gap) of the previously examined cell and continue on in this fashion in a clockwise manner until all of the cells bordering the gap have been examined and one or more problematic cells have been identified. It should be understood that in various embodiments, the routine may start a cell in a different position (e.g., on the south edge of the gap) or proceed in a different direction (e.g., counter-clockwise) or in accordance with a different order or pattern of cell examination.

After one or more problematic cells (i.e., cells that give rise to a rule violation) have been detected, a routine executed by computer 300 may modify the semiconductor layout 200 to avoid the rule violation caused by the problematic cell by, for example, changing the shape of the gap by adding a stitch cell to a portion of the gap 206 to avoid a Boolean DRC failure caused by a partially exposed cell and/or by removing a dangling cell to avoid a Boolean DRC failure caused by the dangling cell. For example, as shown in FIG. 2C, the semiconductor layout 200 may be modified to add a stitch cell 220 in a portion of the gap 206 that is north of the exposed north edge of the partially exposed cell 208 and east of the edge of the adjacent cell 209 such that north edge of the partially exposed cell 208 is no longer partially exposed. According to some embodiments, a stitch cell can be an extension of an already existing cell (e.g., an HVT fill cell may be appended with an HVT stitch cell to extend the width of the fill cell). By filling in a portion of the gap 206 with a stitch cell 220, the partially exposed cell 208 no longer causes a Boolean DRC failure because the NW or VT shape that was failing for example, the minimum width DRC rule, would now be widened to include the portion of NW or VT in the stitch cell 220. Similarly, the computer 300 may remove the dangling fill cell 210 to avoid the Boolean DRC failure it causes, resulting in the creation of an empty space 222 that increases the size of the gap 206. According to some embodiments, if the routine executed by computer 300 determines that the size of the gap 206 should be reduced (e.g., by adding a stitch cell), the routine may first perform a check to ensure that reducing the size of the gap 206 will not frustrate the purpose that the gap 206 was initially created for (e.g., placement of a separately designed layout block). If the insertion of a stitch cell or removal of a dangling cell would affect the ability to correctly place the separately designed layout block, the routine may move one or more neighboring functional or fill cells to ensure stitch cells could be placed to create a uniform boundary up against the boundary of the separately designed layout block. In this way, embodiments of the present invention can provide fill techniques for avoiding Boolean DRC failures that provide technical benefits of a correct-by-construction technique that guarantees DRC a compliant semiconductor layout without or prior to performing any design rule check. These techniques can significantly speed up development time by eliminating what is generally a very difficult and time-consuming debugging process associated with detecting Boolean DRC failures after performing a design rule check.

Figure 4:
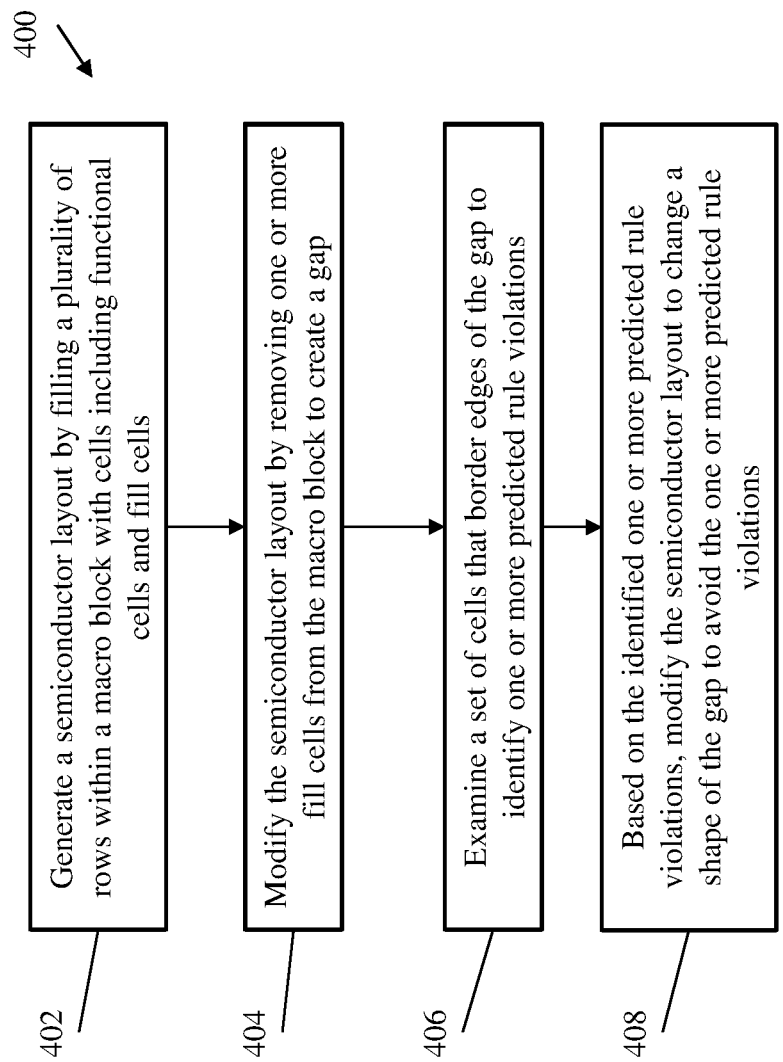
FIG. 4 illustrates a flow diagram of a process for avoiding Boolean DRC failures during cell placement in accordance with one or more embodiments of the present invention.

Turning now to FIG. 4, a flow diagram of a method 400 for avoiding Boolean DRC failures during cell placement in accordance with an embodiment is shown. In one or more embodiments of the present invention, the method 400 may be embodied in software that is executed by elements of computer 300 illustrated in FIG. 3, computer elements located within a network that may reside in the cloud, such as the cloud computing environment 50 described herein above and illustrated in FIGS. 6 and 7. In other embodiments, the computer elements may reside on a computer system or processing system, such as the processing system 800 described herein above and illustrated in FIG. 8, or in some other type of computing or processing environment.

The method 400 begins at block 402 and includes generating (e.g., via computer 300) a semiconductor layout by filling a plurality of rows of a macro block with cells including functional cells and fill cells, for example as described above with respect to FIG. 2A. According to some embodiments, filling the plurality of rows within the macro block with functional cells and fill cells can include positioning cells such that there are no gaps between the cells. For example, filling the plurality of rows with cells can include filling the rows such that there are no gaps between cells (e.g., no 1-pitch, 2-pitch or any other such gaps).

As shown at block 404, the method includes modifying (e.g., via computer 300) the semiconductor layout by removing one or more fill cells from the macro block to create a gap. For example, as will be appreciated by those of skill in the art, in some instances it may be desirable to remove one or more fill cells from the semiconductor layout to create a gap that can later be filled by one or more separately designed layout blocks with different boundary requirements.

As shown at block 406, the method includes examining (e.g., via computer 300) a set of cells that border edges of the gap to identify one or more predicted rule violations (i.e., Boolean DRC rule violations) by for example, identifying cell configurations that will be expected to trigger one or more rule violations. According to some embodiments, the set of cells that border edges of the gap can include each cell that disposed on a north, south, east or west boundary of the gap. It is contemplated that the gap may have an irregular shape, such that there may be for example, more than one boundary in a given dimension (e.g., two eastern boundaries and two northern boundaries that are both disjoined because the gap has an "L" shape). In some embodiments, the one or more predicted rule violations can include Boolean design rule check violations such as minimum area, minimum width and/or minimum space violations. According to some embodiments, identifying one or more predicted rule violations can include determining that there is an inappropriate n-well area, threshold voltage area or other similar mask layer shape between at least one of the set of cells and the gap (e.g., as described above with respect to FIG. 1), violations relating to minimum spaces between shapes (e.g., caused by issues with a fill routine), or other such circumstances that may lead to a possible DRC failure. In some embodiments, identifying one or more predicted rule violations can include identifying a dangling fill cell. A dangling fill cell can be a fill cell having at least two edges that are completely disposed on a boundary of the gap (e.g., such as cell 210 shown in FIG. 2B). In some embodiments, identifying one or more predicted rule violations comprises identifying a partially exposed fill cell, wherein a partially exposed fill cell comprises a fill cell having a first edge that is completely disposed on a boundary of the gap and a second edge that is partially disposed on a boundary of the gap and partially disposed on a boundary of an adjacent cell (e.g., such as cell 208 shown in FIG. 2B).

As shown at block 408, the method includes modifying (e.g., via computer 300) the semiconductor layout to change a shape of the gap to avoid the one or more predicted rule violations based on the identified one or more predicted rule violations. According to some embodiments, modifying the semiconductor layout to change a shape of the gap to avoid the one or more predicted rule violations can include removing the dangling fill cell from the semiconductor layout to create an additional empty space in the gap (e.g., as shown by empty space 222 in FIG. 2C). In some embodiments, modifying the semiconductor layout to change a shape of the gap to avoid the one or more predicted rule violations can include extending the edge of an adjacent cell such that the second edge of the partially exposed fill cell is completely disposed on the boundary of the adjacent cell. As described above, extending an adjacent cell or appending it with a stitch cell can solve a Boolean DRC failure caused by a partially exposed cell that borders the gap (e.g., such as cell 208 in FIG. 2C). According to some embodiments, prior to extending an edge of an adjacent cell to fill in a portion of the gap, the method may include first determining that the portion of the gap is available to be filled in. For example, the method may include determining that a separately designed layout block that is to be inserted into the gap does not require that portion of the gap. Alternately, existing functional cells may have to be moved out of the intended placement location of the separately designed layout block prior to its placement.

Figure 5:
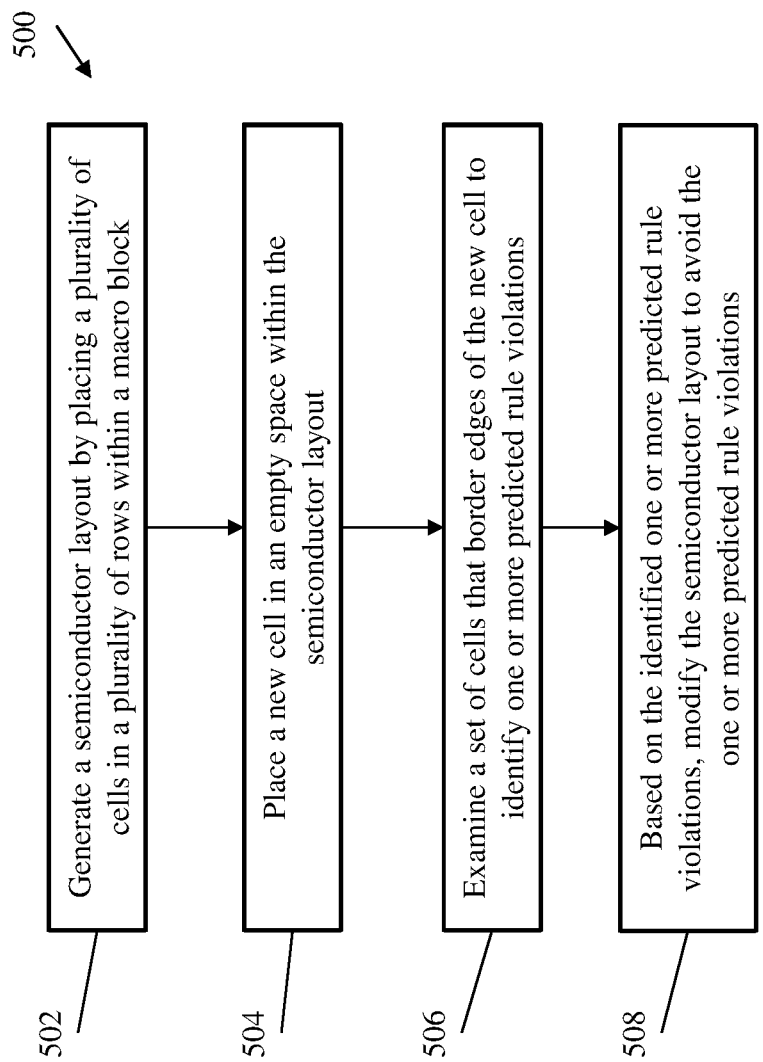
FIG. 5 illustrates another flow diagram of a process for avoiding Boolean DRC failures during cell placement in accordance with one or more embodiments of the present invention.

Turning now to FIG. 5, a flow diagram of another method 500 for avoiding Boolean DRC failures during cell placement in accordance with an embodiment is shown. In one or more embodiments of the present invention, the method 500 may be embodied in software that is executed by elements of computer 300 illustrated in FIG. 3, computer elements located within a network that may reside in the cloud, such as the cloud computing environment 50 described herein above and illustrated in FIGS. 6 and 7. In other embodiments, the computer elements may reside on a computer system or processing system, such as the processing system 800 described herein above and illustrated in FIG. 8, or in some other type of computing or processing environment.

The method 500 begins at block 502 and includes generating (e.g., via computer 300) a semiconductor layout by placing a plurality of cells in a plurality of rows within a macro block, in a manner similar to that of block 402 described above. However, in this case, the rows may not be entirely filled in, such that the semiconductor layout may include one or more empty spaces that can accommodate the placement of one or more new cells.

As shown at block 504, the method includes placing (e.g., via computer 300) a new cell in an empty space within the semiconductor layout. For example, the method may include placing a functional cell or a fill cell in the empty space. In some embodiments, the placed cell may be bordered on all sides by other cells, may be bordered on all sides by an empty space, or may be bordered by a combination of other cells and empty space.

As shown at block 506, the method includes examining (e.g., via computer 300) a set of cells that border edges of the new cell to identify one or more predicted rule violations. If there are no cells that border the edges of the new cell then the method may end. Assuming there are one or more cells that border at least one edge of the new cell that has been placed in the semiconductor layout, then the computer 300 may examine each and all of the surrounding (i.e., immediately adjacent) cells to determine if placement of the new cell would cause a Boolean DRC failure in a manner similar to that previously described above with respect to examination of cells around a gap.

As shown at block 508, the method includes modifying (e.g., via computer 300) the semiconductor layout to avoid the one or more predicted rule violations based on the identified one or more predicted rule violations. For example, similar to the discussion of FIG. 2C above, the computer 300 may add a stitch cell if the new cell is causing a partially exposed cell or may remove the new cell from the semiconductor layout if its placement causes it to be a dangling cell. According to some embodiments, if possible, the method may involve modifying or placing adjacent cells to avoid a potential Boolean DRC issue associated with the placed new cell. For example, the system may remove adjacent cells until an appropriate area for the new cell (e.g., a separately designed layout block) to be placed and then the system may fill in any needed stitches to fill in gaps between the new cell and the nearby circuit rows.

In this way, according to some embodiments, fill techniques for avoiding Boolean DRC failures may be applied after a "hole" is created in the "brick wall" of the semiconductor layout or can alternatively be applied as individual cells are being initially placed within the semiconductor layout.

Additional processes may also be included. It should be understood that the processes depicted in FIGS. 4 and 5 represent illustrations, and that other processes may be added or existing processes may be removed, modified, or rearranged without departing from the scope and spirit of the present disclosure.

Figure 6:
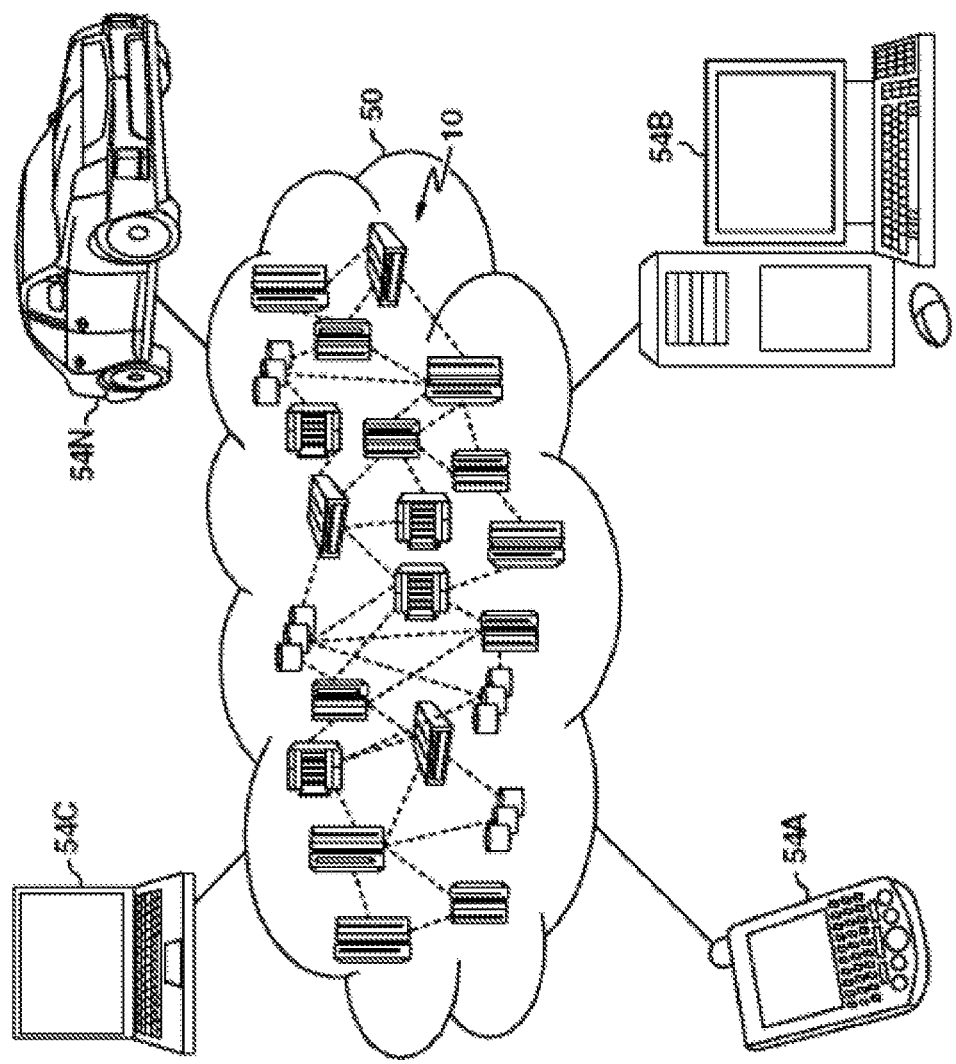
FIG. 6 illustrates a cloud computing environment according to one or more embodiments of the present invention.
Figure 7:
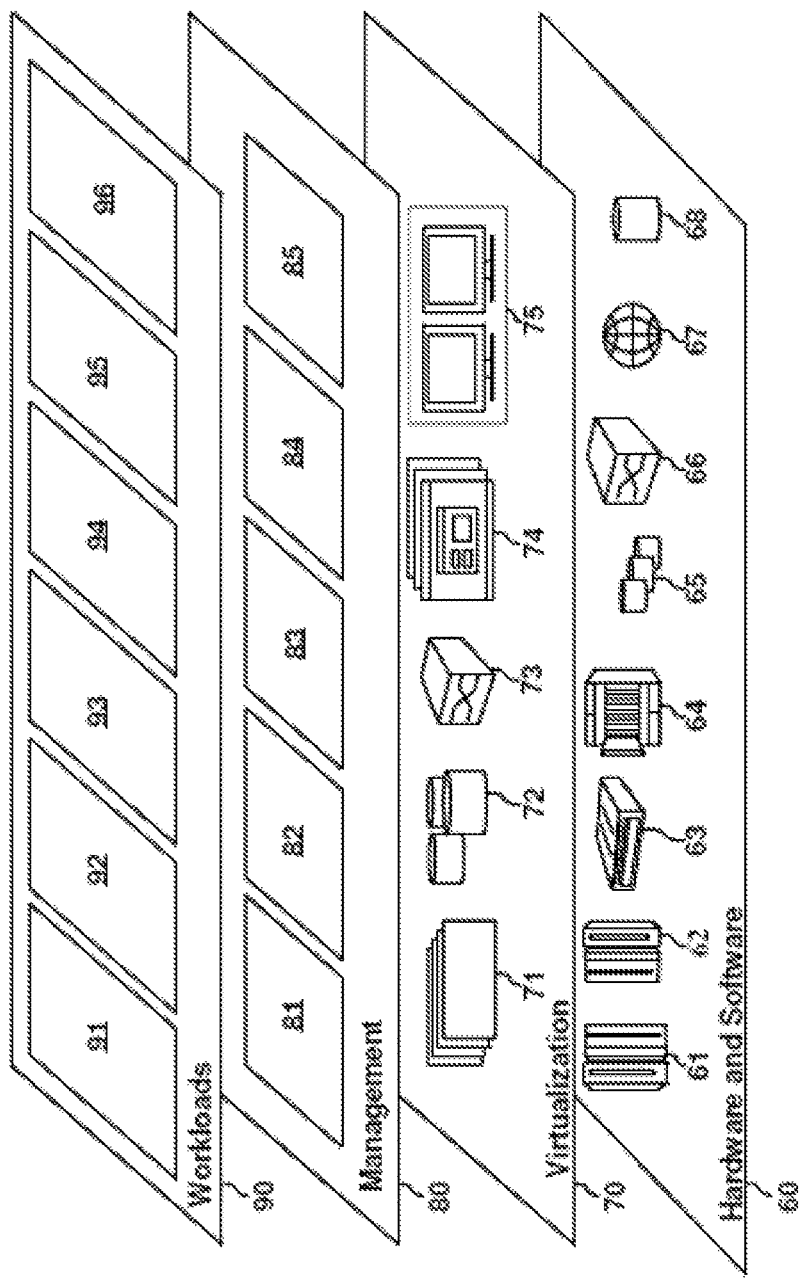
FIG. 7 illustrates abstraction model layers according to one or more embodiments of the present invention.

FIG. 6 depicts a cloud computing environment according to one or more embodiments of the present invention. FIG. 7 depicts abstraction model layers according to one or more embodiments of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and avoiding Boolean DRC failures during cell placement 96.

Figure 8:
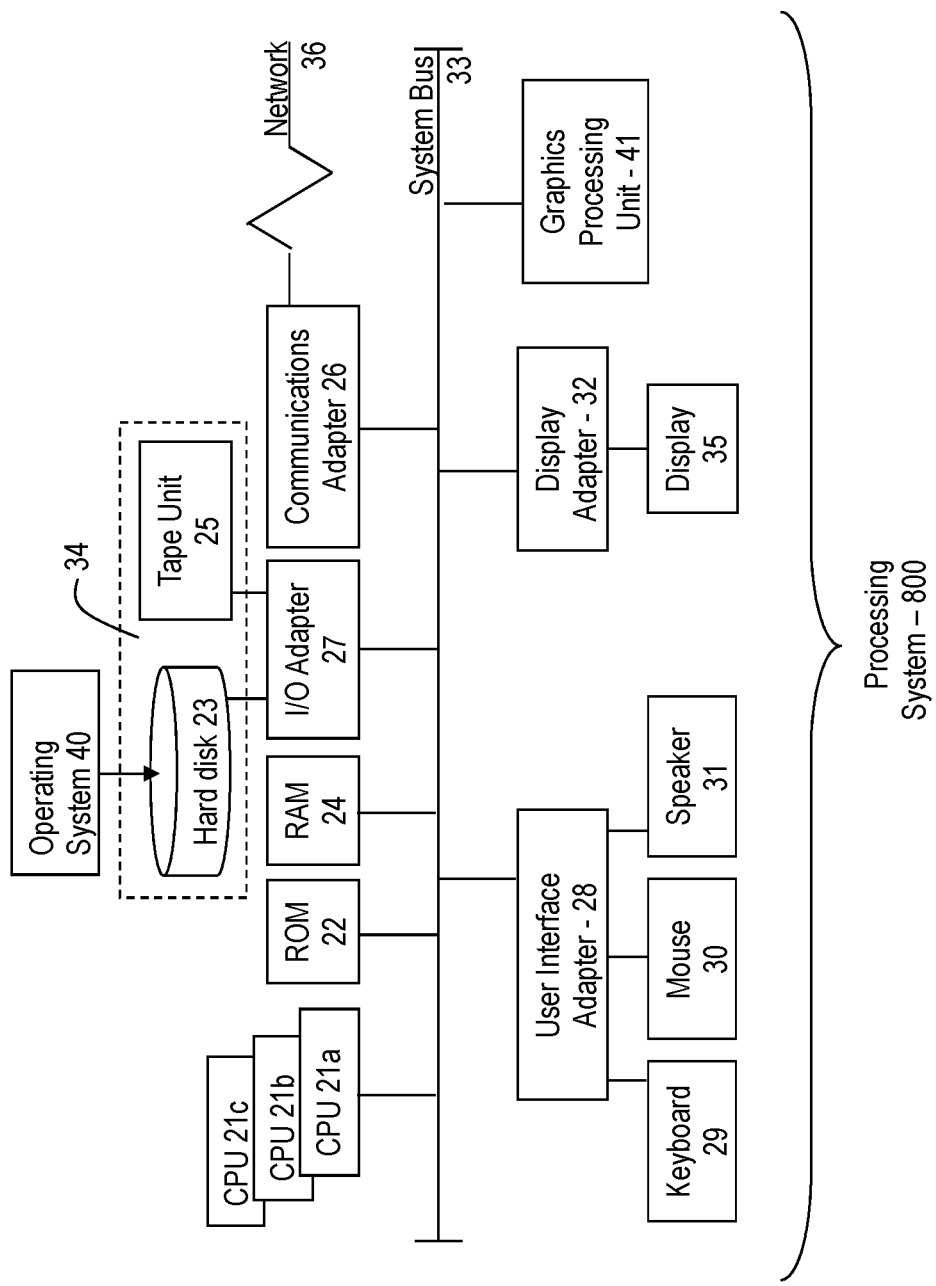
FIG. 8 illustrates a block diagram of a computer system for use in implementing one or more embodiments of the present invention.

FIG. 8 depicts a processing system for implementing one or more embodiments of the present invention. It is understood that one or more embodiments of the present invention are capable of being implemented in conjunction with any other type of computing environment now known or later developed. For example, FIG. 8 depicts a block diagram of a processing system 800 for implementing the techniques described herein. In accordance with one or more embodiments of the present invention, computer 300 and/or system 800 can be an example of a cloud computing node 10 of FIG. 6. In the embodiment shown in FIG. 8, processing system 800 has one or more central processing units (processors) 21a, 21b, 21c, etc. (collectively or generically referred to as processor(s) 21 and/or as processing device(s)). According to one or more embodiments of the present invention, each processor 21 can include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and can include a basic input/output system (BIOS), which controls certain basic functions of processing system 800.

Further illustrated are an input/output (I/O) adapter 27 and a communications adapter 26 coupled to system bus 33. I/O adapter 27 can be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 800 can be stored in mass storage 34. The RAM 24, ROM 22, and mass storage 34 are examples of memory 19 of the processing system 800. A network adapter 26 interconnects system bus 33 with an outside network 36 enabling the processing system 800 to communicate with other such systems.

A display (e.g., a display monitor) 35 is connected to system bus 33 by display adaptor 32, which can include a graphics adapter to improve the performance of graphics intensive applications and a video controller. According to one or more embodiments of the present invention, adapters 26, 27, and/or 32 can be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 can be interconnected to system bus 33 via user interface adapter 28, which can include, for example, a Super I/O chip integrating multiple device adapters into a single integrated circuit.

According to one or more embodiments of the present invention, processing system 800 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing and has a highly parallel structure that makes it more effective than general-purpose CPUs for algorithms where processing of large blocks of data is done in parallel.

Thus, as configured herein, processing system 800 includes processing capability in the form of processors 21, storage capability including system memory (e.g., RAM 24), and mass storage 34, input means such as keyboard 29 and mouse 30, and output capability including speaker 31 and display 35. According to one or more embodiments of the present invention, a portion of system memory (e.g., RAM 24) and mass storage 34 collectively store an operating system such as the AIX® operating system from IBM Corporation to coordinate the functions of the various components shown in processing system 800.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilizes a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device. Semiconductor lithography is the formation of three-dimensional relief images or patterns on the semiconductor substrate for subsequent transfer of the pattern to the substrate. In semiconductor lithography, the patterns are formed by a light sensitive polymer called a photo-resist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    generating a semiconductor layout by filling a plurality of rows of a macro block with cells comprising functional cells and fill cells;
    modifying the semiconductor layout by removing one or more fill cells from the macro block to create a gap;
    examining a set of cells that border edges of the gap to identify one or more predicted rule violations; and
    based on the identified one or more predicted rule violations, modifying the semiconductor layout to change a shape of the gap to avoid the one or more predicted rule violations.

2. The computer-implemented method of claim 1, wherein filling the plurality of rows within the macro block with functional cells and fill cells comprises positioning cells such that there are no gaps between the cells.

3. The computer-implemented method of claim 1, wherein the set of cells that border edges of the gap comprises each cell that disposed on a north, south, east or west boundary of the gap.

4. The computer-implemented method of claim 1, wherein the one or more predicted rule violations comprise Boolean design rule check violations.

5. The computer-implemented method of claim 1, wherein the one or more predicted rule violations comprise minimum area, minimum width or minimum space violations.

6. The computer-implemented method of claim 1, wherein identifying one or more predicted rule violations comprises determining that there is an inappropriate n-well area, threshold voltage area or other similar mask layer shape between at least one of the set of cells and the gap.

7. The computer-implemented method of claim 1, wherein identifying one or more predicted rule violations comprises identifying a dangling fill cell, wherein a dangling fill cell comprises a fill cell having at least two edges that are completely disposed on a boundary of the gap.

8. The computer-implemented method of claim 7, wherein modifying the semiconductor layout to change a shape of the gap to avoid the one or more predicted rule violations comprises removing the dangling fill cell from the semiconductor layout.

9. The computer-implemented method of claim 1, wherein identifying one or more predicted rule violations comprises identifying a partially exposed fill cell, wherein a partially exposed fill cell comprises a fill cell having a first edge that is completely disposed on a boundary of the gap and a second edge that is partially disposed on a boundary of the gap and partially disposed on a boundary of an adjacent cell.

10. The computer-implemented method of claim 9, wherein modifying the semiconductor layout to change a shape of the gap to avoid the one or more predicted rule violations comprises extending the edge of the adjacent cell such that the second edge of the partially exposed fill cell is completely disposed on the boundary of the adjacent cell.

11. A system comprising:
    a memory having computer readable instructions; and
    one or more processors for executing the computer readable instructions, the computer readable instructions controlling the one or more processors to perform operations comprising:
        generating a semiconductor layout by filling a plurality of rows within a macro block with cells comprising functional cells and fill cells;
        modifying the semiconductor layout by removing one or more fill cells from the macro block to create a gap;
        examining a set of cells that border edges of the gap to identify one or more predicted rule violations; and based on the identified one or more predicted rule violations, modifying the semiconductor layout to change a shape of the gap to avoid the one or more predicted rule violations.

12. The system of claim 11, wherein filling the plurality of rows within the macro block with functional cells and fill cells comprises positioning cells such that there are no gaps between the cells.

13. The system of claim 11, wherein the set of cells that border edges of the gap comprises each cell that disposed on a north, south, east or west boundary of the gap.

14. The system of claim 11, wherein the one or more predicted rule violations comprise Boolean design rule check violations.

15. The system of claim 11, wherein identifying one or more predicted rule violations comprises identifying a dangling fill cell, wherein a dangling fill cell comprises a fill cell having at least two edges that are completely disposed on a boundary of the gap.

16. The system of claim 15, wherein modifying the semiconductor layout to change a shape of the gap to avoid the one or more predicted rule violations comprises removing the dangling fill cell from the semiconductor layout.

17. A computer program product comprising a computer readable storage medium having program instructions embodied therewith, the program instructions executable by a computer processor to cause the computer processor to perform a method comprising:
   generating a semiconductor layout by filling a plurality of rows within a macro block with cells comprising functional cells and fill cells;
   modifying the semiconductor layout by removing one or more fill cells from the macro block to create a gap;
   examining a set of cells that border edges of the gap to identify one or more predicted rule violations; and
   based on the identified one or more predicted rule violations, modifying the semiconductor layout to change a shape of the gap to avoid the one or more predicted rule violations.

18. The computer program product of claim 17, wherein filling the plurality of rows within the macro block with functional cells and fill cells comprises positioning cells such that there are no gaps between the cells.

19. The computer program product of claim 17, wherein the set of cells that border edges of the gap comprises each cell that disposed on a north, south, east or west boundary of the gap.

20. The computer program product of claim 17, wherein the one or more predicted rule violations comprise Boolean design rule check violations.

* * * * *